US012683138B2

(12) United States Patent
Daniels et al.

(10) Patent No.: US 12,683,138 B2
(45) Date of Patent: Jul. 14, 2026

(54) CALIBRATION TECHNIQUES FOR MASS SPECTROMETRY SYSTEM

(71) Applicant: DH Technologies Development Pte. Ltd., Singapore (SG)

(72) Inventors: Scott Daniels, Northampton, MA (US); Aaron Stella, Derry, NH (US); Michal Weinstock, Newton, MA (US)

(73) Assignee: DH Technologies Development Pte. Ltd., Singapore (SG)

( * ) Notice: Subject to any disclaimer, the term of this patent is extended or adjusted under 35 U.S.C. 154(b) by 329 days.

(21) Appl. No.: 18/589,559

(22) Filed: Feb. 28, 2024

(65) Prior Publication Data

US 2024/0297028 A1 Sep. 5, 2024

Related U.S. Application Data

(60) Provisional application No. 63/449,107, filed on Mar. 1, 2023.

(51) Int. Cl.
H01J 49/00 (2006.01)
G06F 3/0484 (2022.01)

(52) U.S. Cl.
CPC ........ H01J 49/0009 (2013.01); G06F 3/0484 (2013.01)

(58) Field of Classification Search
CPC ........................... H01J 49/0009; G06F 3/0484
See application file for complete search history.

(56) References Cited

U.S. PATENT DOCUMENTS

2022/0308066 A1* 9/2022 Cournoyer .......... H01J 49/0009
2023/0079433 A1* 3/2023 Intelmann ........... H01J 49/0009
250/252.1

* cited by examiner

*Primary Examiner* — Nicole M Ippolito
(74) *Attorney, Agent, or Firm* — Lathrop GPM LLP; Malaika O.D. Tyson; Jason Kuchar

(57) ABSTRACT

A method for calibrating a mass spectrometry (MS) system includes: receiving at least one input through a corresponding to a calibrator in a sample, wherein the sample includes an analyte, and wherein the sample is analyzed by the MS system; automatically determining a plurality of transitions in the sample corresponding to the calibrator according to natural abundances of isotopes; automatically determining concentrations of the plurality of transitions according to a concentration of the calibrator in the sample; identifying a plurality of transitions as calibrator transitions and for identifying a different one of the plurality of transitions as an internal standard; detecting a concentration of each of the plurality of transitions and the calibrator in the sample; automatically calibrating the MS system based in part on the detected concentrations of the plurality of calibrator transitions and the internal standard; and detecting the concentration of the analyte in response to execution of the calibration instructions.

20 Claims, 6 Drawing Sheets

*Testosterone*

*Amplifex Keto-Derivatized Testosterone*

Precursor Ion

Chemical Formula: $C_{19}H_{29}O_2^+$
Exact Mass: 289.22

MS/MS

Product Ion

Chemical Formula: $C_6H_9O^+$
Exact Mass: 97.06

Precursor Ion

Chemical Formula: $C_{25}H_{43}N_2O_2^+$
Exact Mass: 403.33

MS/MS

Product Ion

Chemical Formula: $C_9H_{14}NO^+$
Exact Mass: 152.11

| Cal # | Mass Q1 | Mass Q3 | Mass NL | Abundance Q3 | Abundance NL | Abundance Expected | Expected Concentration | Dilution (IDF) |
|---|---|---|---|---|---|---|---|---|
| 1 | 403.33 | 152.11 | 251.22 | 100.000% | 100.000% | 100.000% | 1150.0 ng/dL | |
| 2 | 404.33 | 152.11 | 252.23 | 18.042% | 100.000% | 18.042% | 207.5 ng/dL | 5.5 |
| 3 | 404.33 | 153.11 | 251.22 | 100.000% | 10.299% | 10.299% | 118.4 ng/dL | 9.7 |
| 4 | 405.34 | 153.11 | 252.23 | 18.042% | 10.299% | 1.858% | 21.4 ng/dL | 53.8 |
| 5 | 405.34 | 152.11 | 253.23 | 1.739% | 100.000% | 1.739% | 20.0 ng/dL | 57.5 |
| 6 | 405.33 | 154.11 | 251.22 | 100.000% | 0.682% | 0.682% | 7.8 ng/dL | 146.5 |
| 7 | 406.34 | 153.11 | 253.23 | 1.739% | 10.299% | 0.179% | 2.1 ng/dL | 558.4 |
| 8 | 406.34 | 154.11 | 252.23 | 18.042% | 0.682% | 0.123% | 1.4 ng/dL | 812.1 |
| 9 | 406.34 | 152.11 | 254.23 | 0.119% | 100.000% | 0.119% | 1.4 ng/dL | 843.5 |
| 10 | 406.34 | 155.11 | 251.22 | 100.000% | 0.034% | 0.034% | 0.4 ng/dL | 2925.7 |
| 11 | 407.34 | 153.11 | 254.23 | 0.119% | 10.299% | 0.012% | 0.1 ng/dL | 8190.8 |
| 12 | 407.34 | 154.11 | 253.23 | 1.739% | 0.682% | 0.012% | 0.1 ng/dL | 8426.7 |
| 13 | 407.34 | 152.11 | 255.23 | 0.006% | 100.000% | 0.006% | 0.1 ng/dL | 16185.2 |
| 14 | 407.34 | 155.11 | 252.23 | 18.042% | 0.034% | 0.006% | 0.1 ng/dL | 16216.1 |
| 15 | 407.34 | 156.12 | 251.22 | 100.000% | 0.001% | 0.001% | 0.0 ng/dL | 82749.0 |
| 16 | 408.34 | 154.11 | 254.23 | 0.119% | 0.682% | 0.001% | 0.0 ng/dL | 123598.3 |
| 17 | 408.34 | 153.11 | 255.23 | 0.006% | 10.299% | 0.001% | 0.0 ng/dL | 157159.0 |
| 18 | 408.34 | 155.11 | 253.23 | 1.739% | 0.034% | 0.001% | 0.0 ng/dL | 168260.5 |
| 19 | 408.34 | 152.11 | 256.24 | 0.000% | 100.000% | 0.000% | 0.0 ng/dL | 398608.9 |
| 20 | 408.34 | 156.12 | 252.23 | 18.042% | 0.001% | 0.000% | 0.0 ng/dL | 458643.2 |
| 21 | 409.35 | 154.11 | 255.23 | 0.006% | 0.682% | 0.000% | 0.0 ng/dL | 2371524.0 |
| 22 | 409.35 | 155.11 | 254.23 | 0.119% | 0.034% | 0.000% | 0.0 ng/dL | 2467957.2 |
| 23 | 408.34 | 157.12 | 251.22 | 100.000% | 0.000% | 0.000% | 0.0 ng/dL | 3392582.8 |
| 24 | 409.35 | 153.11 | 256.24 | 0.000% | 10.299% | 0.000% | 0.0 ng/dL | 3870517.0 |
| 25 | 409.35 | 156.12 | 253.23 | 1.739% | 0.001% | 0.000% | 0.0 ng/dL | 4758934.6 |

Molecular Formula

| Atom | Q1 | Q3 | NL |
|---|---|---|---|
| C | 25 | 9 | 16 |
| H | 43 | 14 | 29 |
| N | 2 | 1 | 1 |
| O | 2 | 1 | 1 |
| S | | | |
| P | | | |
| Br | | | |
| Cl | | | |
| F | | | |
| B | | | |
| Si | | | |
| Se | | | |
| $^{13}$C | | | |
| $^{2}$H | | | |
| $^{14}$N | | | |
| $^{18}$O | | | |

| Concentration | 1150 |
|---|---|
| Concentration Unit | ng/dL |

| Isotopic Purity (%) | |
|---|---|
| $^{13}$C | 99 |
| $^{2}$H | 100 |
| $^{15}$N | 99 |
| $^{18}$O | 95 |

| Selected | ID | Q1 Mass (Da) | Q3 Mass (Da) | Retention Time (min) | Declustering Potential | Entrance Potential | Collision Energy | Collision Cell Exit Potential |
|---|---|---|---|---|---|---|---|---|
| ☐ | 1-Methylhistidine,3- | | | | | | | |
| ☐ | Methionine | 330.19 | 113.1 | 4.3 | 40 | 10 | 18.056 | 30 |
| ☐ | Ammadipic Acid | 302.17 | 113.1 | 4.7 | 40 | 10 | 17.742 | 30 |
| ☐ | Arginine | 315.21 | 113.1 | 4.3 | 40 | 10 | 18.172 | 30 |
| ☐ | Argininosuccinic Acid | 431.23 | 113.1 | 3.9 | 40 | 10 | 22.601 | 50 |
| ☐ | Asparagine | 273.16 | 113.1 | 3.4 | 40 | 10 | 16.784 | 30 |
| ☐ | Aspartic Acid | 274.14 | 113.1 | 3.5 | 40 | 10 | 16.817 | 30 |
| ☐ | Carnitine | 367.21 | 113.1 | 4.3 | 40 | 10 | 19.888 | 30 |
| ☐ | Citrulline | 316.2 | 113.1 | 4.1 | 40 | 10 | 18.205 | 30 |
| ☐ | Cystathionine | 503.27 | 113.1 | 5.1 | 40 | 10 | 24.078 | 50 |
| ☐ | Cysteine | 521.22 | 113.1 | 5.3 | 40 | 10 | 24.97 | 50 |
| ☐ | Serine | 282.16 | 113.1 | 3.9 | 40 | 10 | 14.441 | 30 |
| ☐ | Ethanolamine | 244.17 | 113.1 | 4.9 | 40 | 10 | 15.828 | 30 |
| ☐ | Gamma Amino Butyric Acid | 287.17 | 113.1 | 3.7 | 40 | 10 | 17.247 | 30 |
| ☐ | Glutamine | 286.16 | 113.1 | 4 | 40 | 10 | 17.279 | 30 |
| ☐ | Glutamic Acid | 216.13 | 113.1 | 3.6 | 40 | 10 | 14.902 | 30 |
| ☐ | Glycine | 336.21 | 113.1 | 4.8 | 40 | 10 | 18.887 | 30 |
| ☐ | Homocitrulline | 349.25 | 113.1 | 6.6 | 40 | 10 | 20.885 | 50 |
| ☐ | Homocysteine | 296.17 | 113.1 | 3.7 | 40 | 10 | 17.544 | 30 |
| ☐ | Histidine | 443.3 | 113.1 | 4.8 | 40 | 10 | 21.999 | 30 |
| ☐ | Hydroxylysine | 372.1 | 113.1 | 3.5 | 40 | 10 | 16.749 | 30 |
| ☐ | Hydroxyproline | 272.2 | 113.1 | 7.4 | 40 | 10 | 16.753 | 30 |
| ☐ | Isoleucine/Leucine/Norleucine | 427.3 | 113.1 | 5.5 | 40 | 10 | 21.971 | 50 |
| ☐ | Lysine | 290.15 | 113.1 | 6 | 40 | 10 | 17.345 | 30 |
| ☐ | Methionine | 326.1 | 113.1 | 4.1 | 40 | 10 | 17.871 | 30 |
| ☐ | Oxidized Methionine | 413.29 | 113.1 | 5.1 | 40 | 10 | 21.409 | 30 |
| ☐ | Ornithine | 282.12 | 113.1 | 3.1 | 40 | 10 | 17.08 | 30 |
| ☐ | Phosphoethanolamine | 308.2 | 113.1 | 7.5 | 40 | 10 | 17.875 | 30 |
| ☐ | Phenylalanine | 356.17 | 113.1 | 5.2 | 40 | 10 | 18.228 | 30 |
| ☐ | Proline | 336.11 | 113.1 | 2.7 | 40 | 10 | 18.552 | 30 |
| ☐ | Phosphoserine | 283.15 | 113.1 | 4.3 | 40 | 10 | 15.985 | 30 |
| ☐ | Sarcosine/Alanine | 246.15 | 113.1 | 3.3 | 40 | 10 | 15.888 | 30 |
| ☐ | Serine | 266.12 | 113.1 | 3 | 40 | 10 | 16.552 | 30 |
| ☐ | Taurine | 260.16 | 113.1 | 4 | 40 | 10 | 16.365 | 30 |
| ☐ | Threonine | 345.19 | 113.1 | 6.2 | 40 | 10 | 19.161 | 30 |
| ☐ | Tryptophan | 523.18 | 113.1 | 6.4 | 40 | 10 | 18.402 | 30 |
| ☐ | Tyrosine | 461.27 | 113.1 | 6.5 | 40 | 10 | 23.025 | 30 |
| ☐ | Valine/Norvaline | 298.18 | 113.1 | 6.2 | 40 | 10 | 16.79 | 30 |

FIG. 5

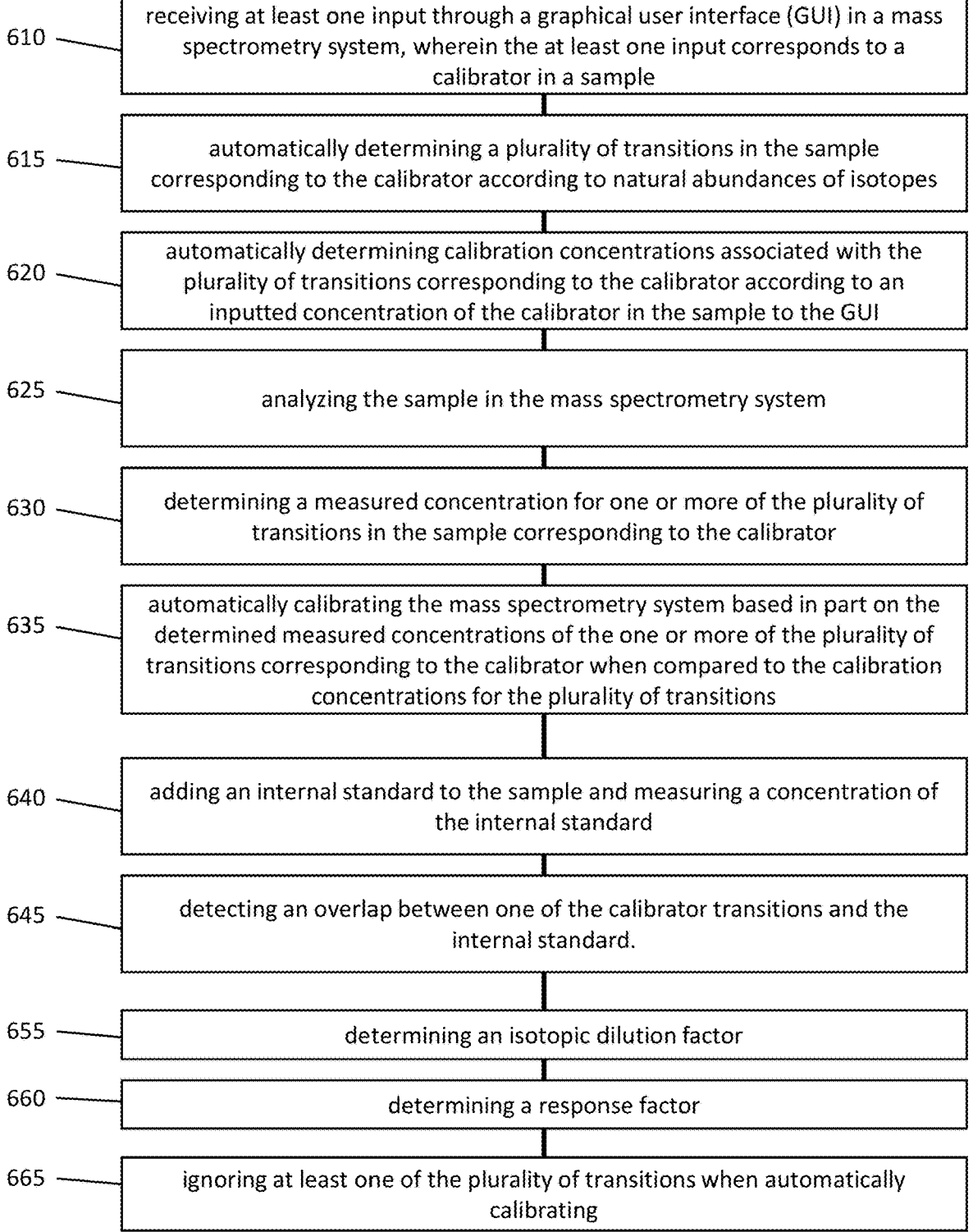

610 — receiving at least one input through a graphical user interface (GUI) in a mass spectrometry system, wherein the at least one input corresponds to a calibrator in a sample 615 — automatically determining a plurality of transitions in the sample corresponding to the calibrator according to natural abundances of isotopes 620 — automatically determining calibration concentrations associated with the plurality of transitions corresponding to the calibrator according to an inputted concentration of the calibrator in the sample to the GUI 625 — analyzing the sample in the mass spectrometry system 630 — determining a measured concentration for one or more of the plurality of transitions in the sample corresponding to the calibrator 635 — automatically calibrating the mass spectrometry system based in part on the determined measured concentrations of the one or more of the plurality of transitions corresponding to the calibrator when compared to the calibration concentrations for the plurality of transitions 640 — adding an internal standard to the sample and measuring a concentration of the internal standard 645 — detecting an overlap between one of the calibrator transitions and the internal standard.

655 — determining an isotopic dilution factor

660 — determining a response factor

665 — ignoring at least one of the plurality of transitions when automatically calibrating

CALIBRATION TECHNIQUES FOR MASS SPECTROMETRY SYSTEM

RELATED APPLICATIONS

The present patent application claims the priority benefit of U.S. Provisional Patent Application Ser. No. 63/449,107, filed Mar. 1, 2023, the content of which is hereby incorporated by reference in its entirety into this disclosure.

BACKGROUND

Generally, this application relates to quantification of analytes with a mass spectrometry system. Analytical samples, including biological samples and bodily liquids, can often provide critical analytical information. Presently, compounds of a related group (i.e., drugs and metabolites, hormones in a pathway, biomarkers, and/or peptides from a particular biologic drug) are generally screened for the presence of an analyte of interest.

SUMMARY

One aspect of the disclosure is a method for mass spectrometry calibration, the method comprising receiving at least one input corresponding to a calibrator in a sample, and wherein the sample is configured to be analyzed by the mass spectrometry system; automatically determining a plurality of transitions in the sample corresponding to the calibrator according to natural abundances of isotopes; automatically determining calibration concentrations associated with the plurality of transitions corresponding to the calibrator according to an inputted concentration of the calibrator in the sample; analyzing the sample in the mass spectrometry system, and from the analysis, determining a measured concentration for one or more of the plurality of transitions in the sample corresponding to the calibrator; and automatically calibrating the mass spectrometry system based in part on the determined measured concentrations of the one or more of the plurality of transitions corresponding to the calibrator when compared to the calibration concentrations for the plurality of transitions.

In an aspect, the method further includes wherein one of the plurality of transitions is classified as an internal standard transition and the analyzing the sample in the mass spectrometer comprises adding an internal standard to the sample and measuring a concentration of the internal standard, and further including detecting an overlap between the internal standard transition and at least one of the other calibrator transitions.

In an aspect, the at least one input is received and/or the inputted concentration of the calibration in the sample is input through a graphical user interface (GUI). In an aspect, receiving at least one input through the GUI further comprises receiving at least one drawing of at least the calibrator.

In an aspect, the method further includes determining an isotopic dilution factor. In an aspect, the method further includes determining a response factor. In an aspect, if the measured concentrations for one or more of the plurality of transitions in the sample meets a condition, wherein the condition is selected from the group consisting of ionization saturation, detector saturation, product ions generated near a peak apex, peak shape, a threshold intensity and/or a threshold abundance, the isotopic dilution factor is applied to one or more of the plurality of transitions in the sample corresponding to the calibrator to quantify at least one analyte in the sample.

In another aspect, the method further includes ignoring at least one of the plurality of transitions corresponding to the calibrator when performing automatic calibration.

One aspect of the disclosure is a non-transitory computer-readable medium including a set of instructions executable by at least one processor, wherein the non-transitory computer-readable medium includes ion-identification instructions for receiving at least one input through a graphical user interface (GUI) in a mass spectrometry system, wherein the at least one input corresponds to a calibrator in a sample, wherein the sample is configured to be analyzed by the mass spectrometry system; transition-determining instructions for automatically determining a plurality of transitions in the sample corresponding to the calibrator according to natural abundances of isotopes; concentration-determining instructions for automatically determining calibration concentrations corresponding to the calibrator associated with the plurality of transitions according to an inputted concentration of the calibrator in the sample in the GUI; analyzing instructions that determines a measured concentrations corresponding to one or more of the plurality of transitions in the sample corresponding to the calibrator; and calibration instructions for automatically calibrating the mass spectrometry system based in part on the determined measured concentrations of the one or more plurality of transitions when compared to the calibration concentrations for the plurality of transitions.

In an aspect, the calibrator comprises two or more compounds that are isotopic versions of one another. In an aspect, the sample also includes an internal standard and the ion-identification instructions further include either receiving through the GUI or the calculation of, a concentration of the internal standard in the sample and the determination of an internal standard transition and wherein the analyzing instructions also includes determining a measured internal standard concentration from the analysis of the internal standard transition.

In an aspect, the internal standard is an isotopic version of one of the compounds in the calibrator. In another aspect, the internal standard is a surrogate analyte that is not an isotopic version of one of the compounds in the calibrator and the method includes the calculation of a response factor that correlates the concentration of the internal standard to one or more of the compounds in the calibrator.

In an aspect, receiving at least one input through the GUI further comprises receiving at least one drawing of the calibrator. In an aspect, the analyzing instructions further comprise determining an isotopic dilution factor. In an aspect, the analyzing instructions further comprise measuring a sample of an analyte having an unknown concentration wherein the analyte is an isotopic version of one of the compounds in the calibrator and utilizing the calibrated mass spectrometer to determine the concentration of the analyte.

In an aspect, the concentration-determining instructions are further for receiving at least one input through the GUI, wherein the at least one input specifies a concentration of the calibrator, and for automatically determining the concentrations of the plurality of transitions according to the concentration of the calibrator. In an aspect, the method further includes dilution-factor-determining instructions for determining an isotopic dilution factor. In an aspect, the method further includes response-factor-determining instructions for determining a response factor. In an aspect, the method further includes filtering instructions for ignoring at least one of the plurality of transitions when performing the calibration instructions.

Other embodiments of this aspect include corresponding computer systems, apparatus, and computer programs recorded on one or more computer storage devices, each configured to perform the actions of the methods.

One aspect of the disclosure is a mass spectrometry system, including a display configured to display a GUI, wherein the GUI is presented to receive at least one input, wherein the at least one input corresponds to a calibrator in a sample, and wherein the sample is configured to be analyzed by the mass spectrometry system; and a processor configured to present the GUI on the display and receive data corresponding to the at least one input to determine a plurality of transitions in the sample corresponding to the calibrator according to natural abundances of isotopes, wherein the processor is further configured to determine calibration concentrations associated with the plurality of transitions corresponding to the calibrator according to a concentration of the calibrator in the sample received as part of the at least one input from the GUI, wherein the processor is further configured to receive from the mass spectrometer, measured concentrations for one or more of the plurality of transitions corresponding to the calibrator, wherein the processor is further configured to calibrate the mass spectrometry system based in part on the measured concentrations of the one or more plurality of transitions corresponding to the calibrator when compared to the calibration concentrations for the plurality of transitions.

In an aspect, the processor is further configured to detect an overlap between one of the calibrator transitions and an internal standard. In another aspect, the at least one input includes a drawing of the calibrator. In an aspect, the processor is further configured to determine an isotopic dilution factor. In an aspect, the processor is further configured to determine a response factor.

In an aspect, the processor is further configured to receive from the mass spectrometer, measured concentrations for one or more of a plurality of transitions corresponding to a sample, and if at least one of the measured concentrations meets a condition, wherein the condition is selected from the group consisting of ionization saturation, detector saturation, product ions generated near a peak apex, peak shape, a threshold intensity and/or a threshold abundance, the isotopic dilution factor is applied to one or more of the plurality of transitions in the sample corresponding to the calibrator to quantify at least one analyte in the sample.

In another aspect, the processor is further configured to ignore at least one of the plurality of transitions when performing the calibration. Implementations of the described techniques may include hardware, a method or process, or computer software on a computer-accessible medium.

BRIEF DESCRIPTION OF SEVERAL VIEWS OF THE DRAWINGS

FIG. 2 illustrates a graphical user interface, according to embodiments herein.

FIG. 4 illustrates a chromatogram corresponding to a mass spectrometry analysis, according to embodiments herein.

FIG. 5 illustrates a template for identifying specific transitions to be used with future mass spectrometry analyses, according to embodiments herein.

FIG. 6 shows a flow chart for a method of calibrating a mass spectrometry system, according to embodiments herein.

Figures 1A, 1B:
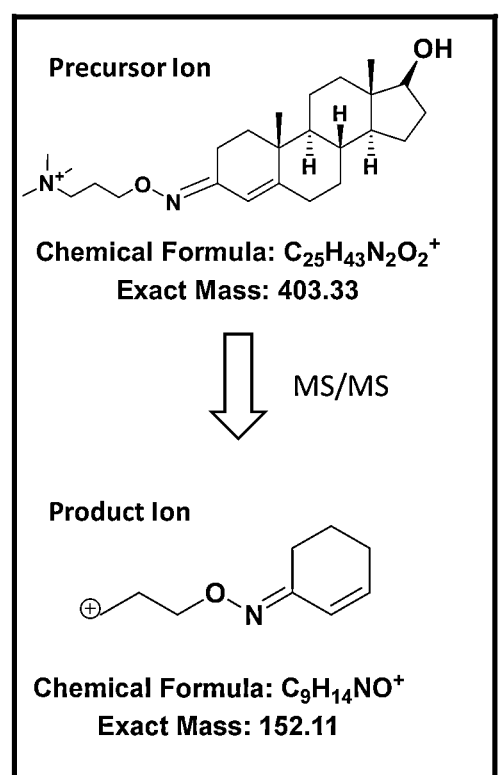
FIG. 1A illustrates an exemplary transition of a testosterone precursor ion and a product ion thereof.
FIG. 1B illustrates an exemplary transition of an amplifex keto-derivatized testosterone precursor ion and a product ion thereof.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings.

DETAILED DESCRIPTION

It is to be understood that this disclosure is not limited to the particular methodology, protocols, and reagents described herein and as such may vary. It is also to be understood that the terminology used herein is for the purpose of describing particular aspects only and is not intended to limit the scope of the present disclosure or the appended claims.

Unless otherwise defined, all technical and scientific terms used herein have the same meaning as commonly understood by one of ordinary skill in the art to which the methods described herein belong. Any reference to standard methods (e.g., ASTM, TAPPI, AATCC, etc.) refers to the most recent available version of the method at the time of filing of this disclosure unless otherwise indicated.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The singular form "a", "an" and "the" include plural referents unless the context clearly dictates otherwise. These articles refer to one or to more than one (i.e., to at least one). As used herein, the term "or" is generally employed in its usual sense including "and/or" unless the content clearly dictates otherwise. The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

Where ranges are given, endpoints include all numbers subsumed within that range (e.g., 1 to 5 includes 1, 1.5, 2, 2.75, 3, 3.80, 4, 5, etc.). Furthermore, unless otherwise indicated or otherwise evident from the context and understanding of one of ordinary skill in the art, values that are expressed as ranges can assume any specific value or subrange within the stated ranges in different embodiments of the disclosure, to the tenth of the unit of the lower limit of the range, unless the context clearly dictates otherwise. Herein, "up to" a number (for example, up to 50) includes the number (for example, 50). The term "in the range" or "within a range" (and similar statements) includes the endpoints of the stated range.

Reference throughout this specification to "one aspect," "an aspect," "certain aspects," or "some aspects," etc., means that a particular feature, configuration, composition, or characteristic described in connection with the aspect is included in at least one aspect of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more aspects.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. The term "about" as used in connection with a numerical value throughout the specification and the claims denotes an interval of accuracy, familiar and acceptable to a person skilled in the art. In general, such interval of accuracy is +/−10%. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The term "exemplary" means serving as a non-limiting example, instance, or illustration. As utilized herein, the terms "e.g.," and "for example" set off lists of one or more non-limiting aspects, examples, instances, or illustrations.

As used herein, the term "substantially" refers to the qualitative condition of exhibiting total or near-total extent or degree of a characteristic or property of interest. Biological and chemical phenomena rarely, if ever, go to completion and/or proceed to completeness or achieve or avoid an absolute result. The term "substantially" is therefore used herein to capture the potential lack of completeness inherent in many biological and chemical phenomena. For example, "substantially" may refer to being within at least about 20%, alternatively at least about 10%, alternatively at least about 5% of a characteristic or property of interest.

The invention is defined in the claims. However, below is a non-exhaustive listing of non-limiting exemplary aspects. Any one or more of the features of these aspects may be combined with any one or more features of another example, embodiment, or aspect described herein.

Aspects of this disclosure include methods for mass spectrometry calibration. In some embodiments, the methods include receiving at least one input corresponding to a calibrator in a sample, and wherein the sample is configured to be analyzed by the mass spectrometry system.

Aspects of this disclosure include a methods for quantifying at least one analyte in a sample by mass analysis. In some aspects, the analyte may be a calibrator. The sample may be a biological sample. Biological samples may be biological fluids, which may include, but are not limited to, blood, plasma, serum, oral fluid, or other bodily fluids or excretions, such as but not limited to saliva, urine, cerebrospinal fluid, lacrimal fluid, perspiration, gastrointestinal fluid, amniotic fluid, mucosal fluid, pleural fluid, sebaceous oil, exhaled breath, and the like. The biological sample may also be tissue (including tissue biopsies), bone marrow, tumor samples, and other biological samples and materials derived therefrom. The sample may also be a chemical sample. Chemical samples may include any type of sample including chemicals, including, but not limited to, water samples. The sample may also be an environmental sample. Non-limiting examples of environmental samples may include air, soil, and wastes (liquids, solids or sludges). The sample may also be a food sample and the food sample may be solid, semisolid, viscous, or liquid. The food sample may also be used to test for food safety, including microbial or bacterial analysis. The sample may also be dissolved in solvent. The solvent may be a liquid, a solid, a gas, or a supercritical fluid. The solvent may be a polar or non-polar solvent. The solvent may be organic solvent. The solvent may be water, including deionized water. The sample may be mixed with a matrix material. A non-limiting example of a matrix material includes crystalline compounds. The sample may also be dissolved into a solution, incorporated into a liquid, or a component in a homogenous system.

An analyte may include a substance whose presence, absence, or concentration is to be determined according to methods of the present disclosure. Typical analytes may include, but are not limited to, organic molecules, hormones (such as thyroid hormones, estradiol, testosterone, progesterone, estrogen), metabolites (such as glucose or ethanol), proteins, lipids, carbohydrates, and sugars, steroids (such as Vitamin D), peptides (such as procalcitonin), nucleic acid segments, biomarkers (pharmaceuticals such as antibiotics, benzodiazepine), drugs (such as immunosuppressant drugs, narcotics, opioids, etc.), molecules with a regulatory effect in enzymatic processes such as promoters, activators, inhibitors, or cofactors, microorganisms (such as viruses (including EBV, HPV, HIV, HCV, HBV, Influenza, Norovirus, Rotavirus, Adenovirus, etc.), bacteria (*H. pylori, Streptococcus*, MRSA, *C. diff, Legionella*, etc.), fungus, parasites (plasmodium, etc.), cells, cell components (such as cell membranes), spores, nucleic acids (such as DNA and RNA), etc. Aspects of the disclosure can also allow for the simultaneous analysis of multiple analytes in the same class or different classes (e.g., simultaneous analysis of metabolites and proteins). In an aspect of the disclosure, the method is used to prepare the sample for clinical analysis. The clinical analysis can be used to screen peptide markers for disease states. The clinical analysis can also be used to screen for drugs of abuse. Non-limiting examples of drugs of abuse include amphetamines, methamphetamines, benzodiazepines, barbiturates, marijuana, cocaine, PCP, methadone, opioids (narcotics), fentanyl, norfentanyl, gabapentin, and pregabalin. In an aspect, the clinical analysis is a clinical urine test or a urinalysis, and the analysis is used to screen for drugs of abuse. Urine is a common biological sample used in testing for drugs of abuse. A urinalysis or clinical urine test can detect the presence of a drug of abuse after the drug effects have worn off.

In an aspect, the sample may be added to a reaction mixture. The reaction mixture may include a first labeled isotopologue and a second labeled isotopologue of the least one analyte of interest. An isotopologue is a molecule that differs only in their isotopic composition from the stable compound. Isotopologues have the same chemical formula and bonding arrangement of atoms, but at least one atom has a different number of neutrons than the parent. For example, isotopologues of water include the replacement of both hydrogen atoms with deuterium isotopes of hydrogen (e.g., heavy water) and the replacement of oxygen with the oxygen-18 isotope (e.g., heavy oxygen water). The first labeled isotopologue and second labeled isotopologue may be labeled with at least one isotopic atom, but depending on the chemical structure, if the analyte of interest has several atoms of the same element, any one (or all) of them can be altered. Any isotopic atom may be used to label the first labeled isotopologue and a second labeled isotopologue including, but not limited to, deuterium, carbon-13, nitrogen-15, or oxygen-18. Also depending on the analysis desired, the isotopic atom of the first labeled isotopologue and the isotopic atom of the second labeled isotopologue are different. The reaction mixture may further include additional isotopologues, such as a third labeled isotopologue, fourth labeled isotopologue, and/or fifth labeled isotopologue.

In an exemplary method, the reaction mixture may further include magnetic beads. Magnetic beads or magnetic particles are typically nanoparticles or microparticles that have paramagnetic properties. Magnetic beads or magnetic particles are typically hydrophilic and disperse easily in aqueous solutions. The surface coating and/or chemistry of the magnetic beads or magnetic particles allow various biomolecules such as proteins, peptides, and nucleic acids to bind to the magnetic beads or magnetic particles. Once a biomolecule of interest is bound to a magnetic bead or magnetic particle, magnetic separation is employed to the magnetic beads or magnetic particles from a suspension by applying a magnetic force. Non-limiting examples of magnetic beads include mixed-phase magnetic beads, affinity ligand-conjugated magnetic beads, enzyme-conjugated magnetic beads, ion exchange magnetic beads, ferromagnetic beads, paramagnetic beads, superparamagnetic beads, and combinations thereof.

Desalting prior to ionization may improve ionization efficiency and may also purify and concentrate the sample.

The sample may be desalted using mixed-phase magnetic beads, including, but not limited to, C4 magnetic beads, C8 magnetic beads, C12 magnetic beads, C18 magnetic beads, cyanopropyl magnetic beads, phenyl magnetic beads, diphenyl magnetic beads, and combinations thereof. The use of C4, C8, C12, or C18 magnetic beads, for example, retains nonpolar solutes, such as peptides.

Enzymatic hydrolysis is a process where peptide bonds in proteins are hydrolyzed using enzymes, such as proteases, peptidases, or peptide hydrolases. Proteases can be either exopeptidases, which act near the end of a polypeptide chain and include, for example, aminopeptidases and dipeptidyl peptidases, or endopeptidases, which act on nonterminal peptide bonds and include, for example, serine proteases, cysteine proteases, aspartic acid proteases, and metallo endopeptidases. Enzymatic hydrolysis can also include the use of the glycosidase family of enzymes that catalyze the breakdown of complex carbohydrates. Suitable hydrolysis enzymes include, but are not limited to, $\beta$-glucuronidase, glucuronidase, trypsin, chymotrypsin, a protease, LysC, LysN, AspN, GluC, ArgC, pronase, pepsin, and prolidase. Suitable hydrolysis enzymes also include those capable of hydrolyzing glyosidic linkages, such as those formed during metabolic processes. Ferromagnetic beads, paramagnetic beads, and/or superparamagnetic beads may also be used to stir the reaction mixture and the sample may be eluted from the magnetic beads prior to being ionized.

In an exemplary aspect, the mixture of the sample with the isotopologue may be ionized using an ionization method known in the art. Non-limiting ionization methods include chemical ionization (CI), electron impact ionization (EI), fast atom bombardment (FAB), electrospray ionization (ESI), atmospheric pressure chemical ionization (APCI), laser ionization (LIMS), matrix assisted laser desorption ionization (MALDI), plasma-desorption ionization (PD), resonance ionization (RIMS), secondary ionization (SIMS), and thermal ionization (TIMS).

In an aspect, the method further includes monitoring, by mass spectrometry, at least one parent or product ion of the analyte of the at least one isotopic ion transition of interest and at least one isotopic ion transition for the first labeled isotopologue and the second labeled isotopologue.

The monitoring of the product ion transition and/or isotopic ion transition may also include monitoring an isotopic abundance for at least one ion pair of the at least one calibration ion and internal standard. As long as the mass-to-charge ratio (m/z) for the calibration ion and internal standard do not overlap, many different ion isotopic transitions can be simultaneously monitored. This allows for the quantification of multiple analytes in one sample. In exemplary methods, two analytes are quantified, alternatively at least three analytes are quantified, alternatively at least four analytes are quantified, alternatively at least five analytes are quantified, alternatively at least six analytes are quantified, alternatively at least seven analytes are quantified, alternatively at least eight analytes are quantified, alternatively at least nine analytes are quantified, alternatively at least ten analytes are quantified.

Product ion transition monitoring is a technique in which the m/z range of a first mass separator is specifically selected to transmit a molecular ion (often referred to as "the parent ion" or "the precursor ion") to an ion fragmentor to produce fragment ions (often referred to as "daughter ions" or "product ion"). The transmitted m/z range of a second mass separator is selected to transmit one or more product ions to a detector that measures the product ion signal. The observed m/z ratio (and may also referred to as "mass data")

of a parent (or precursor) ion and its corresponding product (or daughter) ion is a product ion transition. This ion transition may also be referred to as a precursor-product ion transition or a product-daughter ion transition. In a multiple reaction monitoring ("MRM") workflow, two or more transitions are monitored, each corresponding to a different fragment or product ion. For example, the parent ion of morphine is 286, and the most intense ions created by the fragmentation of 286 are 201, 181, and 165. As such, the three product ion transitions for morphine are 286→201, 286→181, and 286→165.

In other exemplary methods, at least two product ion transitions are monitored, alternatively at least three product ion transitions are monitored, alternatively at least four product ion transitions are monitored, alternatively at least five product ion transitions are monitored, alternatively at least six product ion transitions are monitored, alternatively at least seven product ion transitions are monitored, alternatively at least eight product ion transitions are monitored, alternatively at least nine product ion transitions are monitored, alternatively at least ten product ion transitions are monitored. In some exemplary methods, the product ion has an intensity and/or abundance of about 100%. In some exemplary methods, the product ion is the most intense and/or abundant isotope of the at least one analyte.

In an isotopic multiple reaction monitoring ("Isotopic MRM"), the workflow utilizes the ion transitions based on the natural isotopic abundance of analytes. This ion transition may also be referred to as a precursor-isotopic ion transition or isotopic ion transition. For example, there are two stable isotopes of chlorine; chlorine 35 (75.8% natural abundance) and chlorine 37 (24.2% natural abundance). In general, each natural isotopic ion's relative abundance value is different from another in a proportionally decreasing fashion. For example, the intensity and/or abundance of the isotopic ion is less than about 100%, alternatively less than about 50%, alternatively less than about 25%, alternatively less than about 15%, alternatively less than about 10%, alternatively less than about 5% than a precursor and/or the product ion. The natural isotopic daughter ion acts as an internal standard, allowing for quantification of the analyte without requiring the addition of a calibrant or stable-isotope labeled analyte.

In other exemplary methods, at least two isotopic ion transitions are monitored, alternatively at least three isotopic ion transitions are monitored, alternatively at least four isotopic ion transitions are monitored, alternatively at least five isotopic ion transitions are monitored, alternatively at least six isotopic ion transitions are monitored, alternatively at least seven isotopic ion transitions are monitored, alternatively at least eight isotopic ion transitions are monitored, alternatively at least nine isotopic ion transitions are monitored, alternatively at least ten isotopic ion transitions are monitored.

The methods of this disclosure can be practiced using mass spectrometers single-stage mass spectrometers or that have the ability to select and fragment molecular ions, for example, tandem mass spectrometers, i.e., mass spectrometers that have two mass separators with an ion fragmentor disposed in the ion flight path between the two mass separators. Non-limiting examples of mass separators include, but are not limited to, quadrupoles, RF multipoles, ion traps, time-of-flight (TOF), and TOF in conjunction with a timed ion selector. Non-limiting examples of ion fragmentors include, but are not limited to, those operating on the principles of collision induced dissociation (CID, also referred to as collisionally assisted dissociation (CAD)), photoinduced dissociation (PID), surface induced dissociation (SID), post source decay, by interaction with an electron beam (e.g., electron induced dissociation (EID), electron capture dissociation (ECD)), interaction with thermal radiation (e.g., thermal/black body infrared radiative dissociation (BIRD)), post source decay, or combinations thereof.

Non-limiting examples of a single-stage mass spectrometry system includes magnetic sector, quadrupole, time-of-flight (TOF), and ion traps. Non-limiting examples of tandem mass spectrometry systems for mass analysis include, but are not limited to, those which comprise one or more of a triple quadrupole, a quadrupole-linear ion trap (e.g., QTRAP® System), a quadrupole TOF (e.g., TripleTOF® System), and a TOF-TOF. In some non-limiting aspects, a mass analyzer is configured to perform a first mass analysis on the sample, wherein the first mass analysis is mass screening for an analyte of interest in the sample, and wherein if the analyte of interest is detected in the sample, the mass analyzer is configured to perform a second mass analysis, wherein the second mass analysis is a quantitative analysis.

In an aspect, the sample may be transferred from the sample introduction device to the mass analyzer using transfer techniques generally known in the art such as, for example, techniques including a microinjector, a nanoinjector, an inkjet printer nozzle, an acoustic droplet ejector (ADE), a solid phase extraction system, or a liquid aspiration system. While the transferred volumes may vary, typical volumes of transferred solutions fall within a range of about 2.5 nL to about 500 nL.

Non-limiting examples of the sample introduction device include a chromatography instrument (such as a high performance liquid chromatography (HPLC) instrument, an ultra high performance liquid chromatography instrument (UPLC), micro liquid chromatography, or nano liquid chromatography), microflow system, solid-phase extraction system, liquid-liquid extraction, protein precipitation, differential mobility spectrometer, a trap-and-elute workflow, an open port interface, or direct flow injection. In an aspect, the sample solution may be introduced to the ion source by acoustically ejecting the sample into a mobile phase at an open port interface (OPI) using the acoustic droplet ejector (ADE).

In some aspects, the combination of open port interface (OPI) and acoustic droplet ejection (ADE) is referred to as Acoustic Ejection Mass Spectrometry (AEMS). Examples of acoustic ejection mass spectrometry systems for qualitative mass analysis include an Echo® MS System.

It will further be appreciated that any number of additional elements can be included in the sample processing system including, for example, an ion mobility spectrometer (e.g., a differential mobility spectrometer for ion selection) that is disposed between the ionization chamber and the mass analyzer and is configured to separate ions based on their mobility through a drift gas in high- and low-fields rather than their mass-to-charge ratio. Additionally, it will be appreciated that the mass analyzer can comprise a detector that can detect the ions which pass through the mass analyzer and can, for example, supply a signal indicative of the number of ions per second that are detected.

FIG. 1A illustrates a transition including a testosterone precursor ion and an exemplary product ion. FIG. 1B illustrates a transition including amplifex keto-derivatized testosterone precursor ion and an exemplary product ion. In each example, the precursor ion may be termed a Q1 ion and the product ion may be termed a Q3 ion. A user may identify such precursor ions using the mass spectrometry system.

Such identification may be through a graphical user interface (GUI; not shown). A user may identify a precursor ion by drawing the ion or by other techniques, such as selecting the precursor ion from a limited set of choices in the GUI. The user may also identify a given product ion through the GUI. The user may identify the product ion through a drawing technique, or otherwise selecting the product ion. For example, the mass spectrometry system may provide a limited set of options for the product ion based on the identified precursor ion. For example, the set of possible product ions may be more commonly produced fragments. The set of possible product ions may be determined according to preference, for example, for a given identified test (e.g., user-identified test, as, for example, specified through a GUI). The transition may correspond to a calibrator used in a sample for analysis by the mass spectrometry system. A user may further specify the concentration of the calibrator, for example, through a GUI. The sample may further include an analyte for analysis by the mass spectrometry system or an internal standard.

FIG. 2 depicts a GUI or display on a display, and includes three tables. The information in the table relates to the precursor (Q1) and product (Q3) ions depicted in FIG. 1B (amplifex keto-derivatized testosterone). The first table ("Molecular Formula") lists the number of a given type of atom the precursor and product ions. The first table also shows the "neutral loss" (NL) during ionization, which is equal to the number of atoms in the precursor less the number of atoms in the product.

The second table in FIG. 2 indicates the concentration in the sample of the precursor ion shown in FIG. 1B. A user may be able to interact with the GUI and input the concentration value and/or unit. The concentration may correspond to the certified concentration of a calibrator. In this example, the calibrator is Cal #1, in the third table.

The third table in FIG. 2 depicts, among other things, the expected concentration for a plurality of transitions (referenced as Cal #). The data in the third table may be automatically determined and/or generated by the mass spectrometry system based on isotopes of atoms that constitute transition #1. Each transition #2-25 is a unique isotopologue of transition #1 (in this example, the precursor ion shown in FIG. 1B). For each transition, the masses of Q1, Q3, and NL (neutral loss), which is the mass of ion(s) that are not Q3, and are generated when Q3 is generated. Further, for each transition, the natural abundance of Q3 and NL is calculated, according to isotopic abundances of the constituent atoms—in this case C, H, N, and O. The natural abundances may be automatically determined by the mass spectrometry system according to the natural abundances of the isotopes of the atoms constituting a given ion. The natural abundances of Q3 and NL are then multiplied to obtain an expected abundance. The expected abundance is then multiplied by the known concentration in the second table to arrive at an expected calibration concentration for each transition. Then, an isotopic dilution factor (IDF) can be determined, which may be the ratio between the expected calibration concentration of transition #1 to the given subsequent transition. This IDF may be used as a multiplier to compensate for abundance differences between the naturally occurring abundant isotopes and the corresponding analyte, calibrator, and/or precursor. In some aspects, the precursor is the most abundant isotope. In some aspects, the isotope MRM conditions may be auto-optimized. For example, the theoretical isotope intensity ratio of both precursor and isotopic ions, and the desired intensity level is used to choose the isotope MRM conditions. In a non-limiting example, the most abundant transition peak is the peak that is used to quantify the majority of the samples. The isotopic ion transition peak is a peak of lower abundance that can be used as a dilution factor. The factor difference between the quantifying transition and isotopic ion transition can be easily determined and applied to samples which require quantification using the isotopic ion transition. In some aspects, the IDF is used to quantify at least one analyte in the sample. In this aspect, the IDF may be used if the product ion transition meets a certain condition. In some embodiments, this condition may occur if the analyte has a concentration that is beyond the limits of detection of the system. This condition may lead to a distorted detector response, which limits quantification of the analyte using the product ion transition and/or may results in mass errors. In non-limiting aspects, the condition may be ionization saturation, detector saturation, product ions generated near a peak apex, peak shape, a threshold intensity and/or a threshold abundance. In a non-limiting example, the measured abundance and/or intensity for the isotopic transition may be multiplied by the IDF to quantify the analyte in the sample.

To further illustrate, take the example of transition ##1-5 in the third table FIG. 2. For transition #1, the mass of the precursor ion is 403.33 amu (column 1) and the mass of the product ion is 152.11 amu (column 2). The NL is 251.22 amu (column 3). For this particular transition, 100% of the product ions will be what is shown in column 2 (152.11 amu), as indicated by column 4. Further, 100% of the NL will be what is shown in column 3 (251.22 amu), as indicated by column 5. The expected abundance of a given transition can be determined by multiplying the abundance of Q3 with the abundance of NL, which is 100%*100%=100%. By multiplying the expected abundance with the concentration of the calibrator (in the second table), the expected concentration of the calibrator is shown in column 7, which is 1150 ng/dL.

The row for transition #2 shows a transition having an isotopologue of the calibrator precursor ion in column 1, for which the precursor ion is 404.33 amu. As shown in columns 2 and 3, the product ion is 152.11 amu and the NL is 252.23 amu. For the transition of transition #2, the natural abundance of the product ion is 18.042%, whereas the natural abundance of NL is 100%. This results in an expected abundance of 18.042%, and an expected concentration of 207.5 ng/dL. Further, this indicates an isotopic dilution factor (IDF) of 5.5 (1150/207.5).

The row for transition #3 shows a transition having isotopologues of the calibrator precursor ion and product ion (404.33 amu and 153.11 amu, respectively). The abundances and concentration of the transition #3 transition result in an expected concentration of 118.4 ng/dL and an IDF of 9.7. The remainder of the transition rows show additional transitions and the expected concentrations and IDFs.

The data FIG. 2 may be automatically and/or user populated. For example, the detailed data about each transition may be automatically determined and populated according to the identified calibrator precursor ion (e.g., identified as described in context of FIGS. 1A and 1B). The concentration of the calibrator precursor ion may be automatically populated, or it may be input by a user (e.g., prompted by the system) through a GUI.

Each transition, or a subset thereof, may be classified as one of an internal standard, quality control, unknown (analyte), or other classes, as may be useful for determining the concentration of an analyte in the sample after determining masses of the transitions through mass spectrometry. For example, the transition may be classified as an unknown, one transition may be classified as the internal standard, and/or one or multiple transitions may be classified as calibrators.

As shown in FIG. 5, a user may specify which transitions will be used for a given experiment. In the example of FIG. 5, the transitions are different from what are shown in previous figures. In this case, the transitions are amino acids. Given transitions may be selected for a given experiment. Such specification of transitions may be stored and recalled (e.g., automatically stored and/or recalled). For example, as shown in FIG. 5, some transitions may be excluded from analysis—i.e., the transitions not selected. When the given experiment is performed, these transitions may be excluded. The excluded transitions may be filtered out, such that they are not displayed to the user by the system, or may be indicated as being ignored (e.g., shaded gray). Such a specification may be stored and/or recalled in association with an indicator associated with the sample. For example, a filtering/classification profile may be automatically stored and/or recalled with a given type of experiment according to a barcode or an RFID tag attached to a container holding the sample.

As an example of potentially advantageous classification (e.g., a classification that may expand the useable dynamic range of a mass spectrometry system), a relatively low abundance transition (e.g., one representing a molecule multiple $^{17}O$ atoms) may be used for measuring relatively high concentration (e.g., greater than 1000 ng/dL) analyte. Separately or simultaneously, a relatively high abundance transition (e.g., one representing a molecule containing only a single $^{13}C$ atom) may be used for measuring a relatively low concentration (e.g., less than 20 ng/dL) analyte.

Figure 3:
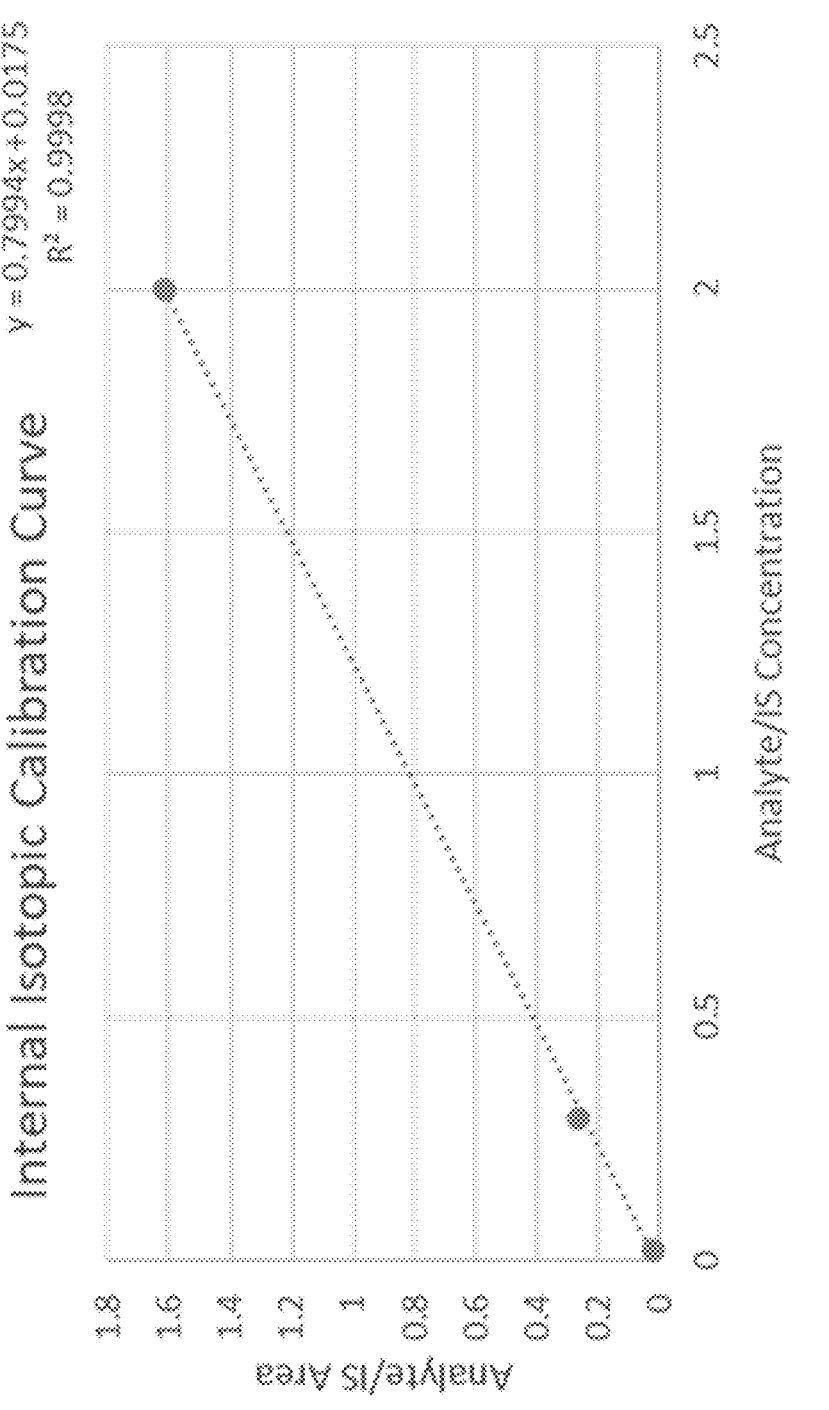
FIG. 3 illustrates an internal isotopic calibration curve, according to embodiments herein.

Once transitions are identified and classified, the mass spectrometry system may determine measured concentrations of the ions identified by the transitions in the sample. As shown in the example of FIG. 3, a calibration curve for a non-limiting example of Fentanyl is depicted. While specifically exemplified with Fentanyl, it should be appreciated that other analytes can be used in the other embodiments. The detected measured concentrations in combination with the predicted calibration concentrations are then used to calibrate the mass spectrometry system (e.g., the portion of the system that processes information output from the detector (e.g., quadrupole mass analyzer). According to other embodiments, calibration information may be used to calibrate the detector.

Figure 4:
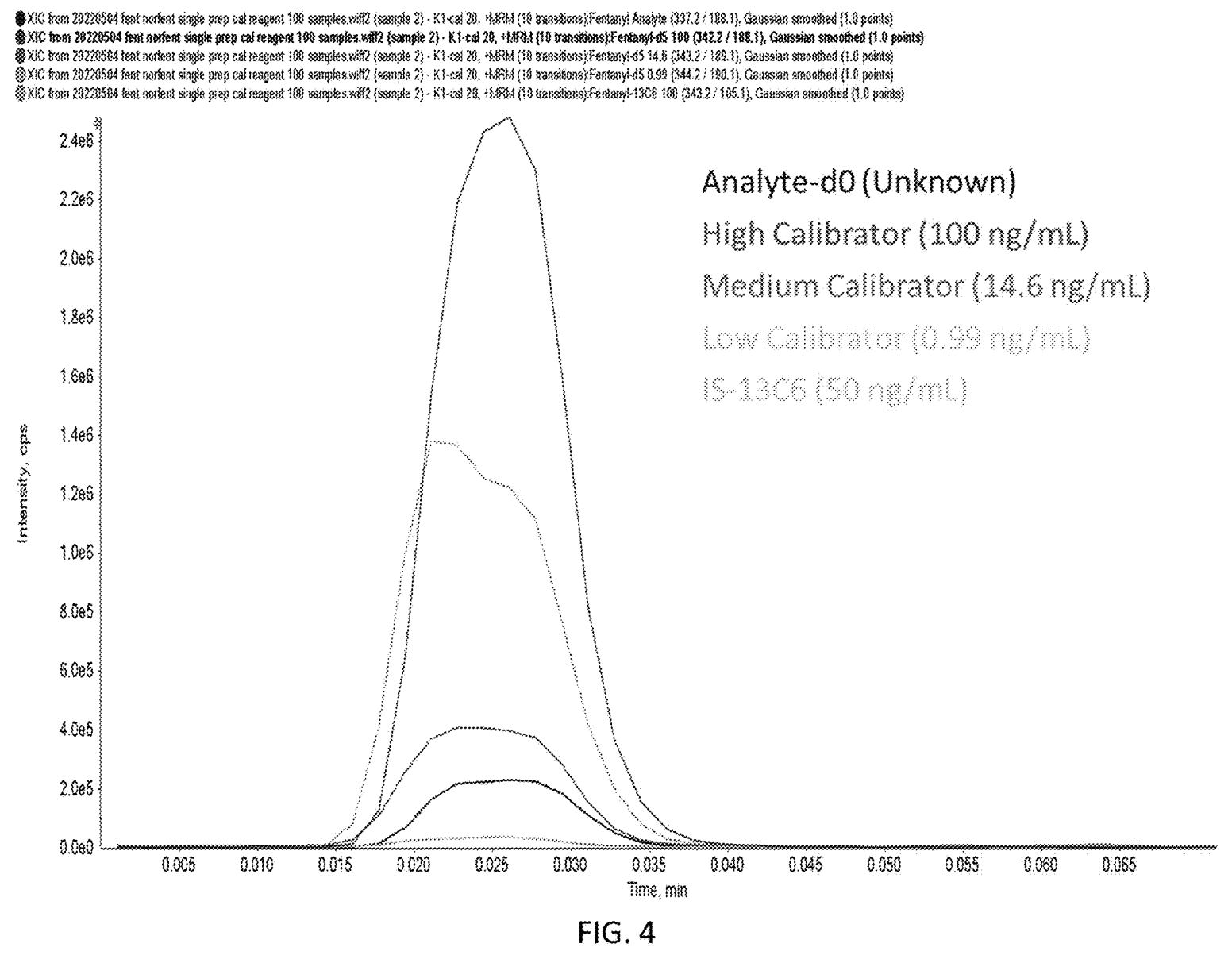

As shown in FIG. 3, in a non-limiting example, a calibration curve is generated for Fentanyl using different isotopologues of Fentanyl. For example, in one embodiment, as shown in FIG. 4, three calibrants that are isotopologues of one another with known concentrations are utilized (100 ng/ml, 14.6 ng/ml and 0.99 mg/ml). Each of these is distinguishable in a mass spectrometer are a result of the differences in isotopes used. For example, the signal for the 100 ng/ml Fentanyl sample can be detected in a mass spectrometer by monitoring the MRM transition at 342.2/188.1. The 14.6 ng/ml sample can be detected by monitoring the MRM transition at 343.2/189.1. The 0.99 ng/ml sample can be detected by monitoring the MRM transition at 344.2/190.1 Lastly, an isotopologue of Fentanyl containing a $^{13}C_6$ atom can also be detected by monitoring the MRM transition of 343.2/105.1. In some embodiments, any one of these isotopologues can be utilized as an internal standard though in this particular example, the $^{13}C_6$ containing isotopologue of Fentanyl is utilized for that purpose. In other embodiments, a single concentration can be utilized to provide a single point calibration.

While demonstrated specifically with the use of Fentanyl, it should be appreciated that this type of isotopologues analysis can be extended to other analytes so long as they can be labelled appropriately using varying isotopes and the fragmenting of the isotopologues of the analyte results in differences in the MRM transitions that are used to detect the analyte. To generate the calibration curve, the natural isotopic abundance of either one or both of the labeled isotopologues to generate a calibration curve with isotopic transitions that do not interfere with the analyte or the internal standard MRM channel.

Prior to analysis, information may be provided to the system (e.g., via user or automatically) that may be used to calibrate the internal calibration curve, and subsequently, the results of the unknown sample. Natural isotopic internal calibration may involve choosing (e.g., by a user or automatically) a surrogate analyte (e.g., a deuterated version of the analyte of interest) to avoid contaminating the unknown transition. This surrogate analyte, although similar to the analyte of interest, may respond differently than the analyte of interest. This difference may be accounted for to obtain accurate results. The user may analyze both the analyte of interest and the surrogate in substantially similar concentrations to obtain each peak's area. The ratio between the peak areas can then be used as a response factor which the software would then factor into the final calculation of the concentration of the unknown. Based on calibration information, the concentration of the analyte may be determined accordingly.

In accordance with the foregoing techniques, it may be possible to detect an overlap (e.g., automatically) between one of the calibrator transitions and one of the other transitions classified as an internal standard. Overlapping and/or isobaric transitions may cause isobaric and/or cross-talking interference. By identifying overlap, an experiment may be performed by excluding undesired overlapping transitions from analysis (e.g., excluding one and/or both of the transitions).

Furthermore, a response factor for signal intensity normalization may be determined by identifying and utilizing the difference between concentrations of two given isotopologues and the analyte of interest.

FIG. 6 shows a flow chart 600 for a method of calibrating a mass spectrometry system, according to embodiments herein. The method, or a portion thereof, may be performed by a processor executing instructions stored on a computer-readable medium. Different instructions may correspond to the different steps, or the same instructions may correspond to multiple steps. The steps in the flow chart 600 may be performed in a different order and/or some steps may be performed simultaneously. Some steps may be omitted and others not shown may be added.

At step 610, at least one input may be received through a GUI in a mass spectrometry system, where the input corresponds to a calibrator in a sample. Example(s) of such input(s) and calibrator may be discussed with respect to FIGS. 1A and 1B and corresponding text, for example.

At step 615, a plurality of transitions in the sample corresponding to the calibrator may be automatically determined according to natural abundances of isotopes. Example(s) of such may be discussed with respect to FIG. 2 and corresponding text, for example.

At step 620, concentrations associated with the transitions corresponding to the concentration of the calibrator in the sample may be automatically determined according to an inputted concentration of the calibrator in the sample to the GUI. Example(s) of such may be discussed with respect to FIG. 2 and corresponding text, for example.

At step 625, the sample may be analyzed in the mass spectrometry system. Example(s) of such may be discussed with respect to FIG. 2 and corresponding text, for example.

At step 630, a concentration of each of the transitions corresponding to the calibrator are determined. Example(s) of such may be discussed with respect to FIGS. 2 and 4, and corresponding text, for example.

At step 635, the mass spectrometry system may be automatically calibrated based at least partially on the determined measured concentrations of the one or more of the plurality of transitions corresponding to the calibrator when compared to the calibration concentrations for the plurality of transitions. Example(s) of such may be discussed with respect to FIG. 3 and corresponding text, for example.

At step 640, an internal standard may be added to the sample and its concentration measured. Example(s) of such may be discussed with respect to FIG. 4 and corresponding text, for example.

At step 645, an overlap between one of the calibrator transitions and the internal standard may be detected (e.g., automatically detected). Example(s) of such may be discussed above.

At step 655, an isotopic dilution factor may be determined (e.g., automatically determined). Example(s) of such may be discussed with respect to FIG. 2 and corresponding text, for example.

At step 660, a response factor may be determined (e.g., automatically determined). Example(s) of such may be discussed with respect to FIG. 4 and corresponding text, for example.

At step 665, at least one of the plurality of transitions may be ignored (e.g., automatically ignored) when automatically calibrating the mass spectrometry system. Example(s) of such may be discussed with respect to FIG. 5 and corresponding text, for example.

Some embodiments described herein relate to a computer storage product with a non-transitory computer-readable medium (also can be referred to as a non-transitory processor-readable medium) having instructions or computer code thereon for performing various computer-implemented operations, including some or all of the embodiments, methods, and/or operations described herein. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments, operations, and/or methods described herein can be performed by software (executed on hardware), hardware, or a combination thereof, including some or all of the embodiments, methods, and/or operations described herein. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.), interpreted languages (JavaScript, typescript, Perl) or other suitable programming languages and/or development tools. Additional examples of computer code include, but are not limited to, control signals, encrypted code, and compressed code.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A method for mass spectrometry calibration, the method comprising:

receiving at least one input corresponding to a calibrator in a sample, and wherein the sample is configured to be analyzed by a mass spectrometry system;

automatically determining a plurality of transitions in the sample corresponding to the calibrator according to natural abundances of isotopes;

automatically determining calibration concentrations associated with the plurality of transitions corresponding to the calibrator according to an inputted concentration of the calibrator in the sample;

analyzing the sample in the mass spectrometry system, and from the analysis, determining a measured concentration for one or more of the plurality of transitions in the sample corresponding to the calibrator; and automatically calibrating the mass spectrometry system based in part on the determined measured concentrations of the one or more of the plurality of transitions corresponding to the calibrator when compared to the calibration concentrations for the plurality of transitions.

2. The method of claim 1, further comprising wherein one of the plurality of transitions is classified as an internal standard transition and the analyzing the sample in the mass spectrometer comprises adding an internal standard to the sample and measuring a concentration of the internal standard, and further comprising detecting an overlap between the internal standard transition and at least one of the other calibrator transitions.

3. The method of claim 1, wherein the at least one input is received and/or the inputted concentration of the calibration in the sample is input through a graphical user interface (GUI).

4. The method of claim 3, wherein said receiving at least one input through the GUI further comprises receiving at least one drawing of at least the calibrator.

5. The method of claim 1, further comprising determining an isotopic dilution factor and/or a response factor.

6. The method of claim 5, wherein if the measured concentrations for one or more of the plurality of transitions in the sample meets a condition, wherein the condition is selected from the group consisting of ionization saturation, detector saturation, product ions generated near a peak apex, peak shape, a threshold intensity and/or a threshold abundance, the isotopic dilution factor is applied to one or more of the plurality of transitions in the sample corresponding to the calibrator to quantify at least one analyte in the sample.

7. A non-transitory computer-readable medium comprising a set of instructions executable by at least one processor, wherein the non-transitory computer-readable medium comprises:

ion-identification instructions for receiving at least one input through a graphical user interface (GUI) in a mass spectrometry system, wherein the at least one input corresponds to a calibrator in a sample, wherein the sample is configured to be analyzed by the mass spectrometry system;

transition-determining instructions for automatically determining a plurality of transitions in the sample corresponding to the calibrator according to natural abundances of isotopes;

concentration-determining instructions for automatically determining calibration concentrations corresponding to the calibrator associated with the plurality of transitions according to an inputted concentration of the calibrator in the sample in the GUI;

analyzing instructions that determines a measured concentrations corresponding to one or more of the plurality of transitions in the sample corresponding to the calibrator; and calibration instructions for automatically calibrating the mass spectrometry system based in part on the determined measured concentrations of the one or more plurality of transitions when compared to the calibration concentrations for the plurality of transitions.

8. The non-transitory computer-readable medium of claim 7, wherein the calibrator comprises two or more compounds that are isotopic versions of one another.

9. The non-transitory computer-readable medium of claim 7, wherein the sample also comprises an internal standard and the ion-identification instructions further include either receiving through the GUI or the calculation of, a concentration of the internal standard in the sample and the determination of an internal standard transition and wherein the analyzing instructions also includes determining a measured internal standard concentration from the analysis of the internal standard transition.

10. The non-transitory computer-readable medium of claim 9, wherein the internal standard is an isotopic version of one of the compounds in the calibrator or wherein the internal standard is a surrogate analyte that is not an isotopic version of one of the compounds in the calibrator and the method includes the calculation of a response factor that correlates the concentration of the internal standard to one or more of the compounds in the calibrator.

11. The non-transitory computer-readable medium of claim 7, wherein said receiving at least one input through the GUI further comprises receiving at least one drawing of the calibrator.

12. The non-transitory computer-readable medium of claim 7, wherein the analyzing instructions further comprise determining an isotopic dilution factor.

13. The non-transitory computer-readable medium of claim 7, wherein the analyzing instructions further comprise measuring a sample of an analyte having an unknown concentration wherein the analyte is an isotopic version of one of the compounds in the calibrator and utilizing the calibrated mass spectrometer to determine the concentration of the analyte.

14. The non-transitory computer-readable medium of claim 7, wherein the concentration-determining instructions are further for receiving at least one input through the GUI, wherein the at least one input specifies a concentration of the calibrator, and for automatically determining the concentrations of the plurality of transitions according to the concentration of the calibrator.

15. The non-transitory computer-readable medium of claim 7, further comprising dilution-factor-determining instructions for determining an isotopic dilution factor, response-factor-determining instructions for determining a response factor, and/or filtering instructions for ignoring at least one of the plurality of transitions when performing the calibration instructions.

16. The non-transitory computer-readable medium of claim 15, wherein if at least one of the measured concentrations corresponding to one or more of the plurality of transitions in the sample meets a condition, wherein the condition is selected from the group consisting of ionization saturation, detector saturation, product ions generated near a peak apex, peak shape, a threshold intensity and/or a threshold abundance, the isotopic dilution factor is applied to one or more of the plurality of transitions in the sample corresponding to the calibrator to quantify at least one analyte in the sample.

17. A mass spectrometry system, comprising:

a display configured to display a GUI, wherein the GUI is presented to receive at least one input, wherein the at least one input corresponds to a calibrator in a sample, and; wherein the sample is configured to be analyzed by the mass spectrometry system; and;

a processor configured to present the GUI on the display and receive data corresponding to the at least one input to determine a plurality of transitions in the sample corresponding to the calibrator according to natural abundances of isotopes;

wherein the processor is further configured to determine calibration concentrations associated with the plurality of transitions corresponding to the calibrator according to a concentration of the calibrator in the sample received as part of the at least one input from the GUI;

wherein the processor is further configured to receive from the mass spectrometer, measured concentrations for one or more of the plurality of transitions corresponding to the calibrator; and wherein the processor is further configured to calibrate the mass spectrometry system based in part on the measured concentrations of the one or more plurality of transitions corresponding to the calibrator when compared to the calibration concentrations for the plurality of transitions.

18. The mass spectrometry system of claim 17, wherein the processor is further configured to detect an overlap between one of the calibrator transitions and an internal standard and/or to determine an isotopic dilution factor and/or a response factor.

19. The mass spectrometry system of claim 17, wherein the at least one input comprises a drawing of the calibrator.

20. The mass spectrometry system of claim 18, wherein the processor is further configured to receive from the mass spectrometer, measured concentrations for one or more of a plurality of transitions corresponding to a sample, and if at least one of the measured concentrations meets a condition, wherein the condition is selected from the group consisting of ionization saturation, detector saturation, product ions generated near a peak apex, peak shape, a threshold intensity and/or a threshold abundance, the isotopic dilution factor is applied to one or more of the plurality of transitions in the sample corresponding to the calibrator to quantify at least one analyte in the sample.

* * * * *